(12) United States Patent
Keum et al.

(10) Patent No.: US 12,244,177 B2
(45) Date of Patent: Mar. 4, 2025

(54) AXIAL FLUX ELECTRIC MACHINE INCLUDING COOLING FINS PROJECTING FROM CASING TO SPACES BETWEEN WINDINGS ON STATOR CORES

(71) Applicant: GM GLOBAL TECHNOLOGY OPERATIONS LLC, Detroit, MI (US)

(72) Inventors: SeungHwan Keum, Northville, MI (US); Jian Yao, Shanghai (CN); Yusheng Zou, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 325 days.

(21) Appl. No.: 17/744,865

(22) Filed: May 16, 2022

(65) Prior Publication Data
US 2023/0318369 A1    Oct. 5, 2023

(51) Int. Cl.
| | |
|---|---|
| *H02K 1/20* | (2006.01) |
| *H02K 1/2798* | (2022.01) |
| *H02K 5/20* | (2006.01) |
| *H02K 16/02* | (2006.01) |
| *H02K 21/24* | (2006.01) |

(52) U.S. Cl.
CPC .............. *H02K 1/20* (2013.01); *H02K 1/2798* (2022.01); *H02K 5/20* (2013.01); *H02K 16/02* (2013.01); *H02K 21/24* (2013.01)

(58) Field of Classification Search
CPC .. H02K 9/22; H02K 5/18; H02K 5/20; H02K 1/2798; H02K 5/203; H02K 1/20; H02K 21/24

USPC ........................................................... 310/58
See application file for complete search history.

(56) References Cited

U.S. PATENT DOCUMENTS

| | | | | |
|---|---|---|---|---|
| 5,233,252 | A * | 8/1993 | Denk | H02K 5/225 310/216.106 |
| 8,981,614 | B2 * | 3/2015 | Oka | H02K 3/325 310/214 |
| 2012/0126642 | A1 * | 5/2012 | Miyamoto | H02K 3/24 310/54 |
| 2016/0211718 | A1 * | 7/2016 | Lucchi | H02K 9/19 |
| 2019/0257319 | A1 * | 8/2019 | Kuronuma | F04D 29/5866 |
| 2019/0288584 | A1 | 9/2019 | Vansompel et al. | |

FOREIGN PATENT DOCUMENTS

| | | |
|---|---|---|
| DE | 10048492 A1 | 4/2002 |
| WO | WO-2020239321 A1 | 12/2020 |
| WO | WO-2021089188 A1 | 5/2021 |

OTHER PUBLICATIONS

U.S. Appl. No. 17/489,552, filed Sep. 29, 2021, Duan et al.
Office Action dated Jan. 12, 2024 from German Patent Office for German Patent No. 10 2022 115 006.2; 7pgs.

* cited by examiner

*Primary Examiner* — Terrance L Kenerly
*Assistant Examiner* — Theodore L Perkins

(57) ABSTRACT

An axial flux electric machine includes a casing, stator cores, windings, and fins. The casing has a hollow cylindrical shape with an inner radial surface and an outer radial surface. The stator cores are spaced circumferentially along the inner radial surface of the casing. The windings are wrapped around the stator cores. The fins project from the inner radial surface of the casing to spaces between the windings.

20 Claims, 4 Drawing Sheets

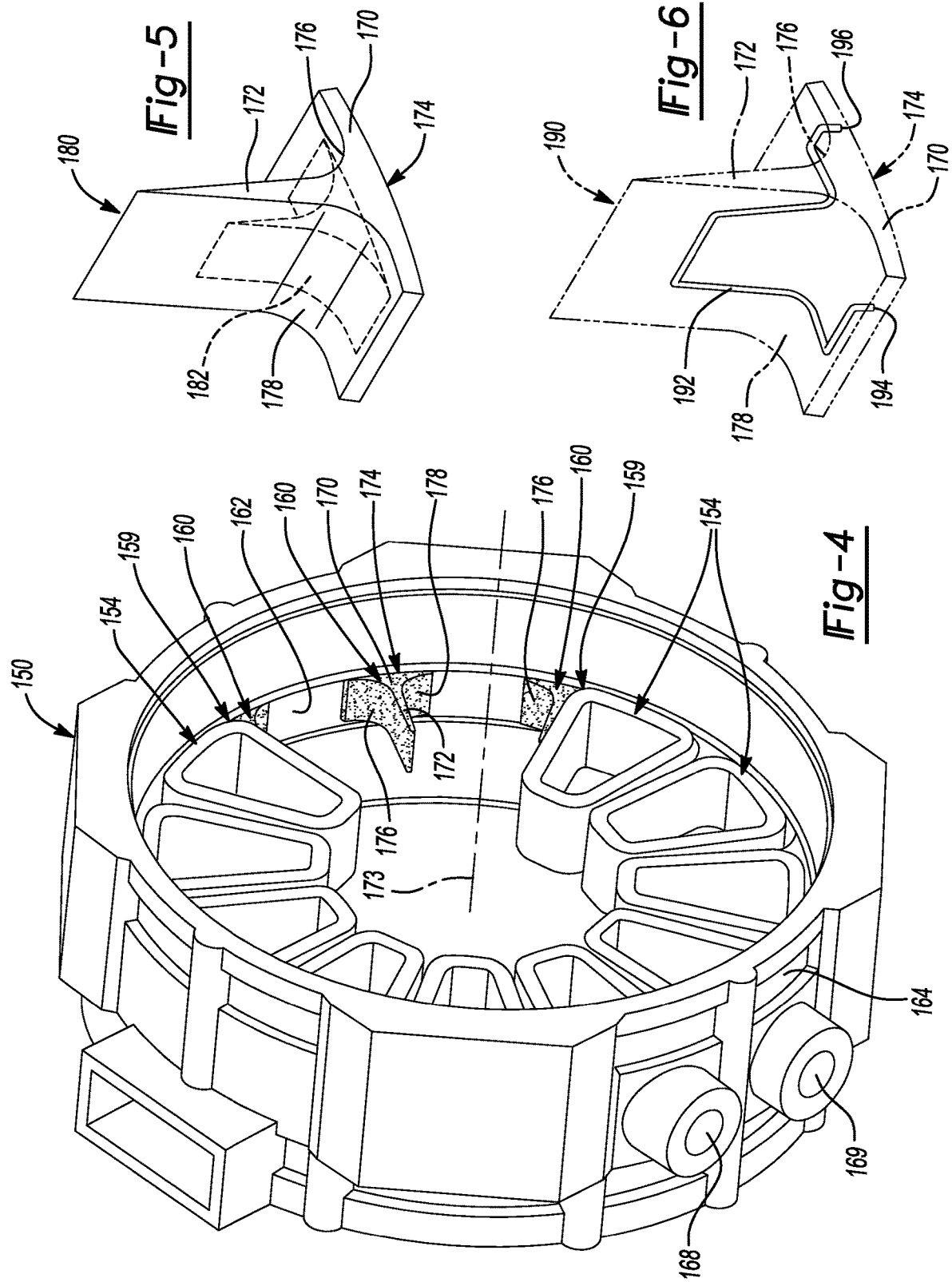

AXIAL FLUX ELECTRIC MACHINE INCLUDING COOLING FINS PROJECTING FROM CASING TO SPACES BETWEEN WINDINGS ON STATOR CORES

CROSS-REFERENCE TO RELATED APPLICATIONS

This application claims the benefit of Chinese Patent Application No. 202210338673.2, filed on Apr. 1, 2022. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to axial flux electric machines including cooling fins projecting from a casing to spaces between windings on stator cores.

An electric machine can operate as a motor and a generator. Motors convert electrical energy into mechanical work by the production of torque. Generators convert mechanical work to electrical energy. Electric vehicles, including battery electric vehicles, hybrid vehicles and fuel cell vehicles, employ electric machines that propel the vehicles when acting as an electric motor that capture braking energy when acting as an electric generator. Motors will be referred to herein; however, it will be understood that such principles also equally apply to generators.

Generally, the electric motor includes a rotor that rotates during operation and a stator that is stationary. The rotor rotates relative to the fixed stator and may contain a plurality of permanent magnets. The rotor is connected to a rotor shaft that also rotates with the rotor. The rotor, including the permanent magnets, is separated from the stator by a predetermined air gap. The stator includes conductors in the form of windings. When electrical energy is applied through the windings, a magnetic field is generated. When electric energy is fed into the windings of the stator, the power is transferred by a magnetic flux that acts on the permanent magnets in the rotor. In this manner, mechanical power can be transferred to the rotating rotor shaft. In an electric vehicle, the rotor thus transmits torque via the rotating shaft to the drive wheels of the vehicle.

Two common types of electric motors include radial flux and axial flux type motors. In a radial flux motor, the rotor and stator are typically situated in a concentric or nested configuration, so that when a stator is energized, it creates a magnetic flux that extends radially from the stator to the rotor. Thus, the windings in the stator are typically arranged parallel to an axis of rotation so that a magnetic field is generated that is oriented in the radial direction from the axis of rotation (along the rotor shaft).

In an axial flux motor, a magnetic field parallel to an axis of rotation is produced by the windings in the stator, so the magnetic flux extends parallel to an axis of rotation (parallel to the rotor shaft). In certain applications, axial flux motors are desirable because they are relatively lightweight, generate increased power, and have a compact size as compared to radial flux motors.

SUMMARY

The present disclosure describes an example of an axial flux electric machine that includes a casing, stator cores, windings, and fins. The casing has a hollow cylindrical shape with an inner radial surface and an outer radial surface. The stator cores are spaced circumferentially along the inner radial surface of the casing. The windings are wrapped around the stator cores. The fins project from the inner radial surface of the casing to spaces between the windings.

In one aspect, the fins are formed integral with the casing as a unitary body.

In one aspect, the fins are formed separate from the casing and attached to the casing.

In one aspect, each fin has a base and a top. The base projects the inner radial surface of the casing. The top projects from the base toward a central longitudinal axis of the casing.

In one aspect, the base of each fin is in direct contact with the casing.

In one aspect, the top of each fin has a triangular-shaped perimeter.

In one aspect, the base of each fin has a first curved surface that abuts the inner radial surface of the casing.

In one example, each stator core has a trapezoidal-shaped perimeter with rounded corners, each winding is wrapped around the trapezoidal-shaped perimeter of one of the stator cores and adopts the shape thereof, and the base of each fin further includes a second curved surface and a third curved surface. The second curved surface receives one of the rounded corners of one of the stator cores and conforming to the shape thereof. The third curved surface receives one of the rounded corners of another one of the stator cores and conforming to the shape thereof.

In one aspect, each fin is a solid piece of metal.

In one aspect, each fin defines a cavity containing a phase change material.

In one aspect, the casing defines a coolant path extending in a circumferential direction around the casing, and the fins are aligned with the coolant path in an axial direction of the casing.

In one aspect, each fine defines a coolant channel in fluid communication with the coolant path of the casing.

The present disclosure also describes an example of a cooling system for an axial flux electric machine. The cooling system includes a casing and fins. The casing has a hollow cylindrical shape with an inner radial surface and an outer radial surface. The fins project from the inner radial surface of the casing and are configured to project into spaces between windings wrapped around stator cores of the axial flux electric machine.

In one aspect, the fins are formed integral with the casing as a unitary body.

In one aspect, the fins are formed separate from the casing and attached to the casing.

In one aspect, each fin has a base and a top. The base projects from the inner radial surface of the casing. The top projects from the base toward a central longitudinal axis of the casing.

In one aspect, each fin is a solid piece of metal.

In one aspect, each fin defines a cavity containing a phase change material.

In one aspect, the casing defines a coolant path extending in a circumferential direction around the casing, and the fins are aligned with the coolant path in an axial direction of the casing.

In one aspect, each fin defines a coolant channel in fluid communication with the coolant path of the casing.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4 is a perspective view of the axial flux electric machine of FIG. 1 with the rotors, the stator cores, and two of the windings omitted to show one of the cooling fins disposed between the two omitted windings;

FIG. 5 is a perspective view of another example of a cooling fin according to the principles of the present disclosure, the fin including a cavity therein, the cavity containing a phase change material; and FIG. 6 is a perspective view of another example of a cooling fin according to the principles of the present disclosure, the fin having a coolant channel therein.

In the drawings, reference numbers may be reused to identify similar and/or identical elements.

DETAILED DESCRIPTION

Figure 1:
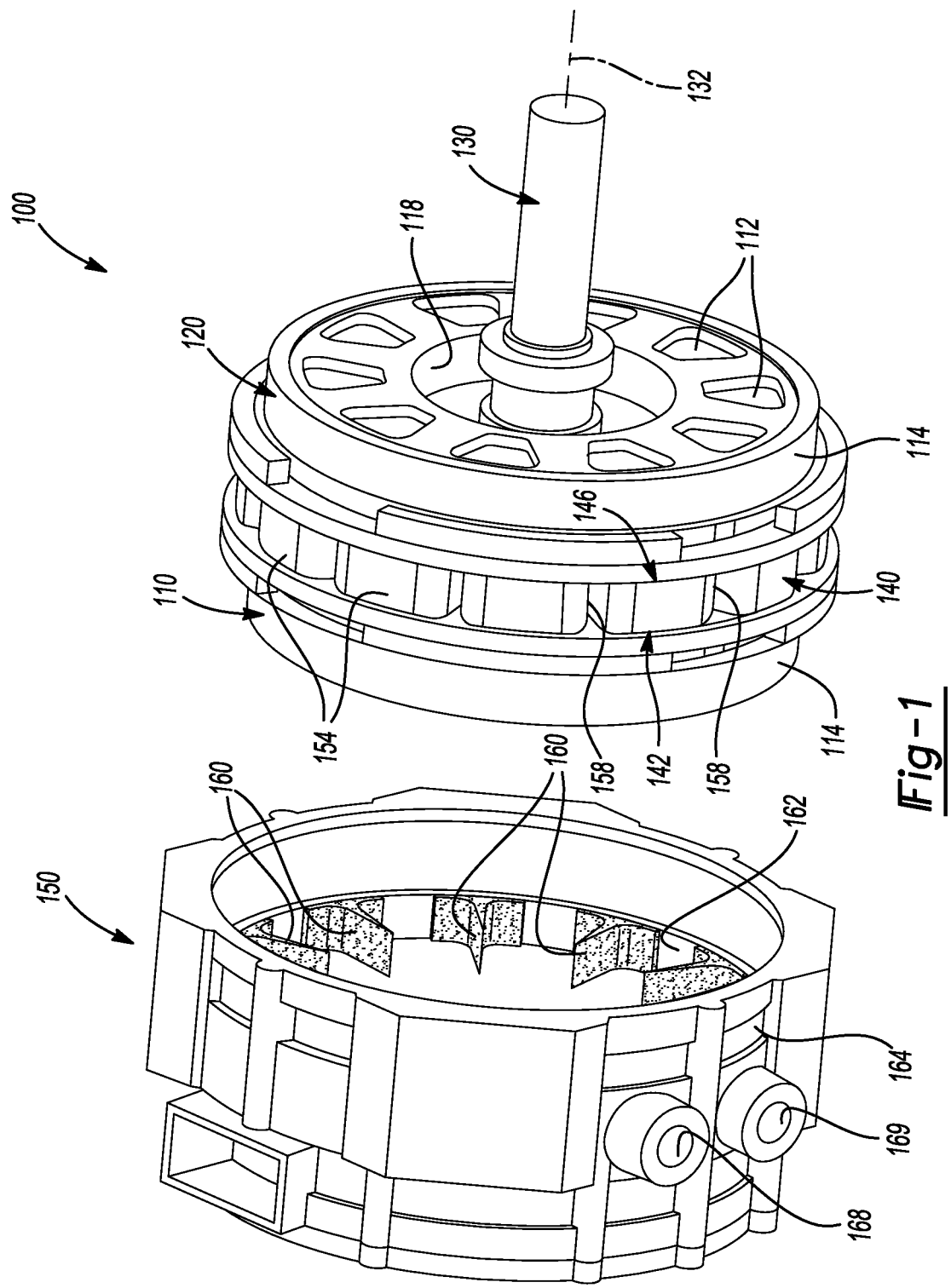
FIG. 1 is a partially exploded perspective view of an example of an axial flux electric machine according to the principles of the present disclosure, the axial flux electric machine including a stator, rotors, a casing, and cooling fins projecting from the casing to spaces between windings on stator cores of the stator.

A stator of an axial flux motor typically includes a plurality of stator cores spaced circumferentially about an inner radial surface of a casing, a winding wrapped around each stator core, and epoxy filling the spaces between the windings. Epoxy is also placed between the stator cores and the inner radial surface of the casing. Thus, the windings have no exposed surface, which makes it difficult to remove heat generates by the windings.

An axial flux motor according to the present disclosure includes a plurality of cooling fins that project from the inner radial surface of the casing and into the spaces between the windings. Each fin includes a base connected to the casing, through which coolant flows. The fins provide a thermal path through which heat generated by the windings is extracted. In addition, the fins replace epoxy in the spaces between the windings, which also improves heat removal.

In various aspects, the present disclosure pertains to cooling fins projecting from a casing to spaces between windings on stators cores of an axial flux electric machines. It will be appreciated that the concepts apply not only to axial flux motors that generate mechanical energy from electrical energy, but also to axial flux generators that can generate electrical energy from mechanical energy. A non-limiting example of an axial flux electric machine in the form of an axial flux motor 100, also known as a pancake motor, is shown in FIGS. 1 through 4.

The motor 100 includes a first rotor 110, a second rotor 120, a rotor shaft 130, a stator 140, a casing 150, and cooling fins 160. The first rotor 110 and the second rotor 120 are both connected to and configured to rotate about the rotor shaft 130. Each of the first and second rotors 110 and 120 has an annular or disk shape with a centrally disposed aperture 118. The rotor shaft 130 passes through the centrally disposed aperture 118. The rotor shaft 130 defines a rotational axis 132 about which the rotors 110, 120 turn.

The stator 140 is disposed between the first rotor 110 and the second rotor 120. The stator 140 has an annular or disk shape. The stator 140 is fixed and stationary, while the first and second rotors 110, 120 rotate during operation with the rotor shaft 130. The first rotor 110 faces a first side 142 of the stator 140 and defines a first air gap (not shown) therebetween. The second rotor 120 faces a second side 146 of the stator 140 and defines a second air gap (not shown) therebetween.

Though motor 100 is shown to have a central single stator 140 and two external rotors 110, 120, as appreciated by those of skill in the art, other configurations are also contemplated. These other variations may include those having two stators and a single rotor, or where the electric motor assembly includes more or fewer rotors and/or stators. The ensuing description also applies to these other embodiments.

Each of the first rotor 110 and the second rotor 120 can have the same design (facing in opposite directions towards the stator 140) and thus the common components will be described herein. Each of the first rotor 110 and second rotor 120 includes a plurality of permanent magnets 112 affixed to a rotor body 114. The permanent magnets 112 may have alternating polarity. Each permanent magnet 112 defines a channel (not shown) therebetween, which extends radially along a face of the respective rotor. In this manner, the permanent magnets 112 and the channel can together define a plurality of magnetic poles.

Figure 2:
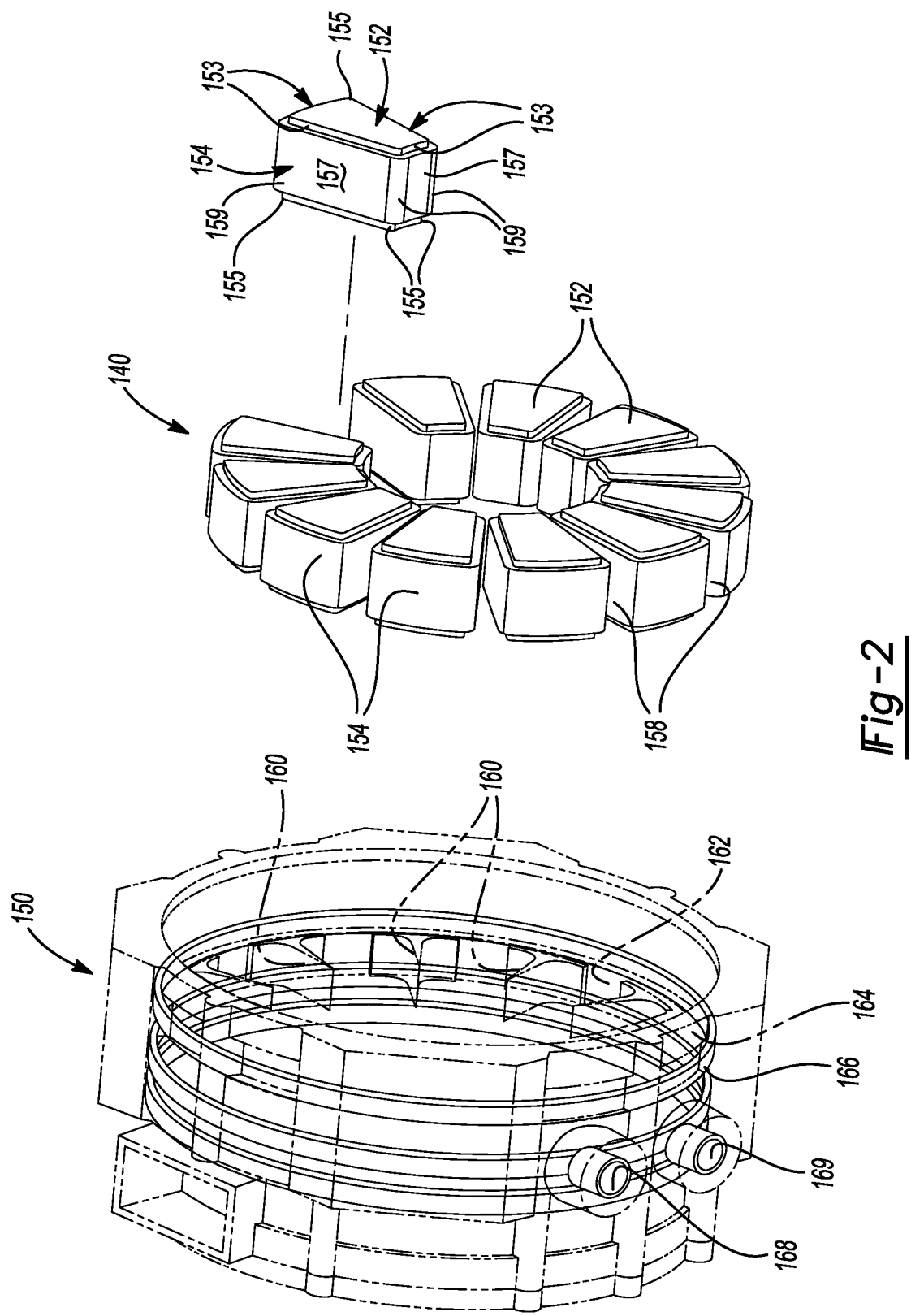
FIG. 2 is an exploded perspective view of the axial flux electric machine of FIG. 1 with the rotors omitted to better illustrate the stator, and with the casing shown in phantom to illustrate coolant paths therein.
Figure 3:
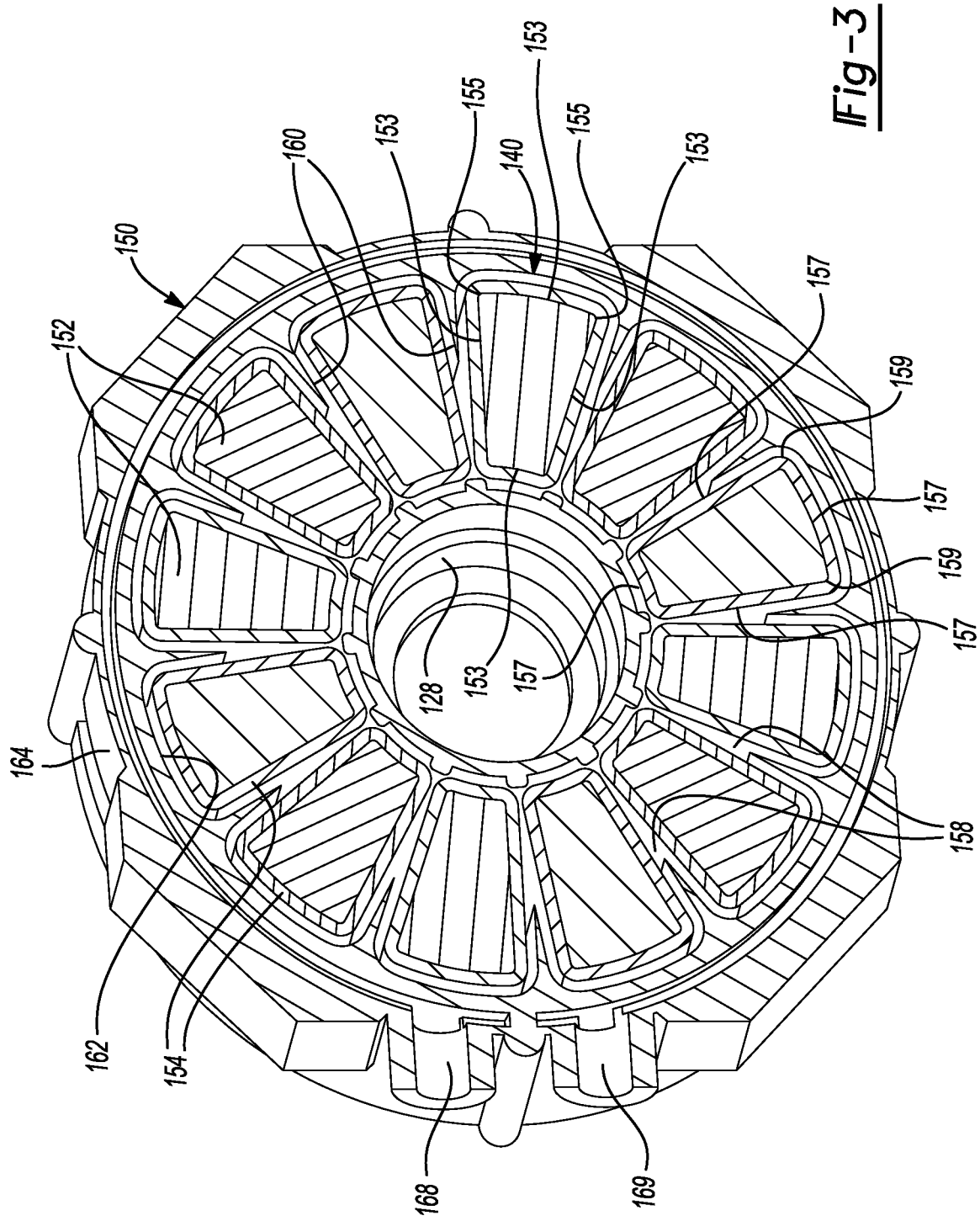
FIG. 3 is a sectioned perspective view of the axial flux electric machine of FIG. 1 illustrating the stator cores, the windings, the casing, and the cooling fins.

As best shown in FIGS. 2 and 3, the stator 140 includes a plurality of stator cores 152 about which a plurality of windings 154 are wrapped. The stator cores 152 are spaced circumferentially along an inner radial surface 162 of the casing 150. The windings 154 may comprise copper or copper alloys. The windings 154 define a plurality of spaces 158 therebetween. The spaces 158 between the stator cores 152 receive the windings 154, which are wound in and through the spaces 158. The stator 140 may be fixed and stationary. Although not illustrated, other winding configurations and technologies as understood in the art are also contemplated. For example, the windings 154 may extend over or bridge the spaces 158.

Each stator core 152 has side surfaces 153 defining a trapezoidal-shaped perimeter with rounded corners 155. Each winding 154 is wrapped around the side surfaces 153 of one of the stator cores 152 and adopts the shape of that stator core 152. Thus, each winding 154 also has side surfaces 157 defining a trapezoidal-shaped perimeter with rounded corners 159.

Rotor shaft 130 passes through a centrally disposed aperture 128 (FIG. 3) in the stator 140 and is supported by bearings that align the rotors 110, 120 with respect to the stator 140 while allowing rotation of the rotor shaft 130. The windings 154 of the stator 140 may be formed of copper or other conductive wires configured to generate a magnetic field when current is applied so as to interact with magnetic fields of the plurality permanent magnets 112 having poles that alternate about the circumference the first and second rotors 110, 120. Different regions of the stator 140 may be selectively energized to impart a rotational force on the first and second rotors 110, 120 causing the rotors 110, 120 and the rotor shaft 130 to rotate with respect to the rotational axis 132.

The axial flux motor 100 having a single stator 140 and first and second rotors 110, 120 is capable of use in high torque applications, including for use in an electric or hybrid vehicle. In such a variation, a housing encasing the motor 100 may be attached to the vehicle frame and at least one output from an end of the rotor shaft 130 is coupled to a reduction gearbox or directly to the vehicle drive wheels. The vehicle application of the axial flux motor 100 is provided as an exemplary embodiment and is not intended to be limiting.

The rotors 110, 120, the rotor shaft 130, and the stator 140 are disposed within the casing 150. The casing 150 may, in certain aspects, be fixed to a vehicle frame and the shaft may be coupled to a gearbox, for example a reduction gearbox, within the vehicle. The casing 150 has a hollow cylindrical shape with the inner radial surface 162 and an outer radial surface 164.

As best shown in FIG. 2, the casing 150 defines a coolant path 166 extending in a circumferential direction around the casing 150. In the example show, the coolant path 166 extends around the circumference of the casing 150 three times. The coolant path 166 has an inlet port 168 and an outlet port 169. Coolant enters the coolant path 166 through the inlet port 168, and coolant exits the coolant path 166 through the outlet port 169. Coolant flowing through the coolant path 166 absorbs heat from the casing 150 and dissipates the heat to a heat exchanger (not shown) and/or the environment.

The fins 160 are aligned with the coolant path 166 in the axial direction of the casing 150 and project from the inner radial surface 162 of the casing 150 and into the spaces 158 between the stator cores 152. The fins 160 absorb heat from the windings 154 and dissipate the heat to the casing 150. In the example shown, the fins 160 are formed integral with the casing 150 as a unitary body. In other examples, the fins 160 are formed separate from the casing 150 and attached to the casing 150 using, for example, fasteners or adhesive (e.g., epoxy). The casing 150 and/or the fins 160 may be formed (e.g., casted) from a metal (e.g., aluminum).

As best shown in FIG. 4, each fin 160 has a base 170 and a top 172. The base 170 of each fin 160 projects from the inner radial surface 162 of the casing 150. The top 172 of each fin 160 projects from the base 170 thereof toward a central longitudinal axis 173 of the casing 150. The top 172 of each fin has a triangular-shaped perimeter.

The base 170 of each fin 160 has a first curved surface 174, a second curved surface 176, and a third curved surface 178. The first curved surface 174 of the base 170 is joined to, directly abuts, and/or projects from the inner radial surface 162 of the casing 150. The second curved surface 176 receives one of the rounded corners 159 of one of the windings 154 and conforms to the shape thereof. The third curved surface 178 receives one of the rounded corners 159 of another one of the windings 154 and conforms to the shape thereof. In the example shown in FIG. 3, the second and third curved surfaces 176 and 178 are spaced apart from the rounded corners 159 of the windings 154 received therein. In other examples, the second and third curved surfaces 176 and 178 are in direct contact with the rounded corners 159 of the windings 154 received therein.

In the example shown in FIGS. 1 through 4, each fin 160 is a solid piece of material (e.g., metal). Referring now to FIG. 5, another example of a fin 180 Is shown. The fin 180 may be used in place of one or more (e.g., each) of the fins 160. The fin 180 has the same shape as the fin 160 and may have the same dimensions of the fin 160. However, in contrast to the fin 160, the fin 180 defines a cavity 182 therein that contains a phase change material. The phase change material may absorb more heat than, for example, solid metal, because some of the energy from the heat is used to change the phase of (e.g., melt) the phase change material.

The phase change material may include sodium, salt hydrates, paraffins, or combinations thereof. Phase change materials have a low thermal conductivity. Therefore, if a solid piece of phase change material is placed in the cavity 182, the phase change may be limited to the surface of the phase change material. Thus, the phase change material may be infused over a porous structure made of a high thermal conductivity material, such as graphite, that conducts heat absorbed from the windings 154 to various locations within the phase change material.

FIG. 6 shows yet another example of a fin 190 that may be used in place of one or more (e.g., each) of the fins 160. Like the fin 180, the fin 190 has the same shape as the fin 160 and may have the same dimensions of the fin 160. However, in contrast to the fin 160, the fin 190 defines a coolant channel 192 therein. The coolant channel 192 has an inlet port 194 and an outlet port 196. The inlet and outlet ports 194 and 196 of the coolant channel 192 are in fluid communication with the coolant path 166 of the casing 150 shown in FIG. 2. Thus, coolant flowing through the coolant path 166 of the casing 150 also flows through the coolant channel 192 of the fin 190. Therefore, the fin 190 may have a higher cooling capacity than the fin 160.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term "and/or" includes any and all combinations of one or more of the associated listed items. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. An axial flux electric machine comprising:
a casing having a hollow cylindrical shape with an inner radial surface and an outer radial surface;
stator cores spaced circumferentially along the inner radial surface of the casing;
windings wrapped around the stator cores; and
fins projecting from the inner radial surface of the casing to spaces between the windings,
wherein each fin includes two concave side surfaces that meet to form a point that is disposed in a space between adjacent windings, and
wherein each fin includes a coolant channel formed within that fin.

2. The axial flux electric machine of claim 1 wherein the fins are formed integral with the casing as a unitary body.

3. The axial flux electric machine of claim 1 wherein the fins are formed separate from the casing and attached to the casing.

4. The axial flux electric machine of claim 1 wherein each fin has a base and a top, the base projecting the inner radial surface of the casing, the top projecting from the base toward a central longitudinal axis of the casing.

5. The axial flux electric machine of claim 4 wherein the base of each fin is in direct contact with the casing.

6. The axial flux electric machine of claim 4 wherein the top of each fin has a triangular-shaped perimeter.

7. The axial flux electric machine of claim 4 wherein the base of each fin has a first curved surface that abuts the inner radial surface of the casing.

8. The axial flux electric machine of claim 7 wherein:
each stator core has a trapezoidal-shaped perimeter with rounded corners;
each winding is wrapped around the trapezoidal-shaped perimeter of one of the stator cores and adopts the shape thereof; and
the base of each fin further includes a second curved surface and a third curved surface, the second curved surface receiving one of the rounded corners of one of the stator cores and conforming to the shape thereof, the third curved surface receiving one of the rounded corners of another one of the stator cores and conforming to the shape thereof.

9. The axial flux electric machine of claim 1 wherein each fin is a solid piece of metal.

10. The axial flux electric machine of claim 1 wherein each fin defines a cavity containing a phase change material.

11. The axial flux electric machine of claim 1 wherein:
the casing defines a coolant path extending in a circumferential direction around the casing; and
the fins are aligned with the coolant path in an axial direction of the casing.

12. The axial flux electric machine of claim 11 wherein the coolant channels of the fins, respectively, are in fluid communication with the coolant path of the casing.

13. A cooling system for an axial flux electric machine, the cooling system comprising:
a casing having a hollow cylindrical shape with an inner radial surface and an outer radial surface; and
fins projecting from the inner radial surface of the casing and configured to project into spaces between windings wrapped around stator cores of the axial flux electric machine,
wherein each fin includes two concave side surfaces that meet to form a point that is disposed in a space between adjacent windings, and
wherein each fin includes a coolant channel formed within that fin.

14. The cooling system of claim 13 wherein the fins are formed integral with the casing as a unitary body.

15. The cooling system of claim 13 wherein the fins are formed separate from the casing and attached to the casing.

16. The cooling system of claim 13 wherein each fin has a base and a top, the base projecting from the inner radial surface of the casing, the top projecting from the base toward a central longitudinal axis of the casing.

17. The cooling system of claim 13 wherein each fin is a solid piece of metal.

18. The cooling system of claim 13 wherein each fin defines a cavity containing a phase change material.

19. The cooling system of claim 13 wherein:
the casing defines a coolant path extending in a circumferential direction around the casing; and
the fins are aligned with the coolant path in an axial direction of the casing.

20. The axial flux electric machine of claim 19 wherein the coolant channels of the fins, respectively, are in fluid communication with the coolant path of the casing.

* * * * *